US008996367B2

(12) United States Patent
Namba et al.

(10) Patent No.: US 8,996,367 B2
(45) Date of Patent: Mar. 31, 2015

(54) SOUND PROCESSING APPARATUS, SOUND PROCESSING METHOD AND PROGRAM

(75) Inventors: Ryuichi Namba, Tokyo (JP); Mototsugu Abe, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1190 days.

(21) Appl. No.: 12/611,906

(22) Filed: Nov. 3, 2009

(65) Prior Publication Data

US 2010/0111313 A1 May 6, 2010

(30) Foreign Application Priority Data

Nov. 4, 2008 (JP) ................................ P2008-283067

(51) Int. Cl.

| | |
|---|---|
| ***G10L 15/00*** | (2013.01) |
| ***H04R 3/00*** | (2006.01) |
| *G10L 25/18* | (2013.01) |
| *G10L 25/93* | (2013.01) |

(52) U.S. Cl.

CPC ................ *H04R 3/005* (2013.01); *G10L 25/18* (2013.01); *G10L 2025/937* (2013.01); *H04R 2430/21* (2013.01); *H04R 2499/11* (2013.01)

USPC ........................................................ 704/233

(58) Field of Classification Search

CPC .................... G10L 15/20; G10L 17/02; G10L 2021/02087

USPC ........................................................ 704/233

See application file for complete search history.

(56) References Cited

FOREIGN PATENT DOCUMENTS

| | | |
|---|---|---|
| JP | 2002-236499 | 8/2002 |
| JP | 2003-131686 | 5/2003 |
| JP | 2006-178314 | 7/2006 |
| JP | 2008-197577 | 8/2008 |
| JP | 2008-258808 | 10/2008 |

*Primary Examiner* — Duc Nguyen

*Assistant Examiner* — Kile Blair

(74) *Attorney, Agent, or Firm* — Finnegan Henderson Farabow Garrett & Dunner LLP

(57) ABSTRACT

There is provided a sound processing apparatus including a sound separation unit that separates an input sound into a plurality of sounds caused by a plurality of sound sources, a sound type estimation unit that estimates sound types of the plurality of sounds separated by the sound separation unit, a mixing ratio calculation unit that calculates a mixing ratio of each sound in accordance with the sound type estimated by the sound type estimation unit, and a sound mixing unit that mixes the plurality of sounds separated by the sound separation unit in the mixing ratio calculated by the mixing ratio calculation unit.

10 Claims, 8 Drawing Sheets

SOUND PROCESSING APPARATUS, SOUND PROCESSING METHOD AND PROGRAM

BACKGROUND OF THE INVENTION

1. Field of the Invention

The present invention relates to a sound processing apparatus, a sound processing method, and a program, and in particular, relates to a sound processing apparatus that remixes sounds separated based on input sound characteristics, a sound processing method, and a program.

2. Description of the Related Art

A call voice, sound of a shooting target and the like are generally recorded by a device equipped with a sound recording apparatus capable of recording sound such as a mobile phone and camcorder. Sound recorded in a sound recording apparatus has sounds originating from various sound sources including a voice uttered by a person and ambient noise mixed therein. If sounds originating from various sound sources are mixed and a sound originating from a desired sound source is recorded relatively lower than sounds originating from other sound sources, there is an issue that it is difficult to determine content of the desired sound.

Thus, technologies to separate a mixed sound in which sounds originating from various sound sources are mixed and then each separated sound is remixed at a desired sound volume are disclosed (for example, Japanese Patent Application Laid-Open No. 2003-131686 and Japanese Patent Application Laid-Open No. 5-56007). According to Japanese Patent Application Laid-Open No. 2003-131686, characteristic data representing a likeness of voice or that of music is learned in advance and a mixing ratio of a voice signal to a music signal is estimated for the music signal on which a narration signal is superimposed to be able to emphasize the desired voice. According to Japanese Patent Application Laid-Open No. 5-56007, a broadcast voice to which additional information is added in advance to separate the broadcast voice into a voice signal and background noise is separated into a voice signal and background noise after the broadcast voice is received so that the voice signal can be remixed at a desired sound volume.

SUMMARY OF THE INVENTION

However, Japanese Patent Application Laid-Open No. 2003-131686 has an issue that it is difficult to separate a mixed sound without learning in advance. Japanese Patent Application Laid-Open No. 5-56007 has an issue that it is difficult to remix the voice in a desired ratio without addition of information in advance.

The present invention has been made in view of the above issues and it is desirable to provide a novel and improved sound processing apparatus capable of separating a mixed sound originating from various sound sources without advance learning and remixing in a desired ratio, a sound processing method, and a program.

According to an embodiment of the present invention, there is provided a sound processing apparatus including a sound separation unit that separates an input sound into a plurality of sounds caused by a plurality of sound sources, a sound type estimation unit that estimates sound types of the plurality of sounds separated by the sound separation unit, a mixing ratio calculation unit that calculates a mixing ratio of each sound in accordance with the sound type estimated by the sound type estimation unit, and a sound mixing unit that mixes the plurality of sounds separated by the sound separation unit in the mixing ratio calculated by the mixing ratio calculation unit.

According to the above configuration, an input sound input into the sound processing apparatus is separated into sounds caused by a plurality of sound sources and a plurality of separated sound types is estimated. Then, a mixing ratio of each sound is calculated in accordance with the estimated sound type and each separated sound is remixed in the mixing ratio. Accordingly, it becomes possible to independently control sounds originating from different sound sources by separating a mixed sound originating from various sound sources and remixing each separated sound in a desired ratio. A desired sound can be prevented from being made difficult to hear by being masked by a sound whose volume is higher than that of the desired sound. Also, the volume originating from each sound source can be adjusted to a desired volume without the need to arrange a microphone or the like for each different sound source.

The sound separation unit may separate the input sound into the plurality of sounds in units of blocks of a predetermined length, comprising including an identity determination unit that determines whether the sounds separated by the sound separation unit are identical among a plurality of blocks, and a recording unit that records volume information of the sounds separated by the sound separation unit in units of the blocks.

The sound separation unit may separate the input sound into the plurality of sounds using statistical independence of sound and differences in spatial transfer characteristics.

The sound separation unit may separate the input sound into a sound originating from a specific sound source and other sounds using a paucity of overlapping between time-frequency components of sound sources.

The sound type estimation unit may estimate whether the input sound is a steady sound or non-steady sound using a distribution of amplitude information, direction, volume, zero crossing number and the like at discrete times of the input sound.

The sound type estimation unit may estimate whether the sound estimated to be a non-steady sound is a noise sound or a voice uttered by a person.

The mixing ratio calculation unit may calculate a mixing ratio that does not significantly change the volume of the sound estimated to be a steady sound by the sound type estimation unit.

The mixing ratio calculation unit may calculate a mixing ratio that lowers the volume of the sound estimated to be a noise sound by the sound type estimation unit and does not lower the volume of the sound estimated to be a voice uttered by a person.

According to another embodiment of the present invention, there is provided a sound processing method including the steps of separating a input sound input by a sound processing apparatus into a plurality of sounds, estimating sound types of the plurality of separated sounds, calculating a mixing ratio of each sound in accordance with the estimated sound type, and mixing the plurality of separated sounds in the calculated mixing ratio.

According to another embodiment of the present invention, there is provided a program for causing a computer to function as a sound processing apparatus including a sound separation unit that separates an input sound into a plurality of sounds, a sound type estimation unit that estimates sound types of the plurality of sounds separated by the sound separation unit, a mixing ratio calculation unit that calculates a mixing ratio of each sound in accordance with the sound type estimated by the sound type estimation unit, and a sound mixing unit that mixes the plurality of sounds separated by the sound separation unit in the mixing ratio calculated by the mixing ratio calculation unit.

According to the present invention, as described above, a mixed sound originating from various sound sources can be separated and then remixed in a desired ratio without performing preprocessing.

DETAILED DESCRIPTION OF EMBODIMENT

Figure 1:
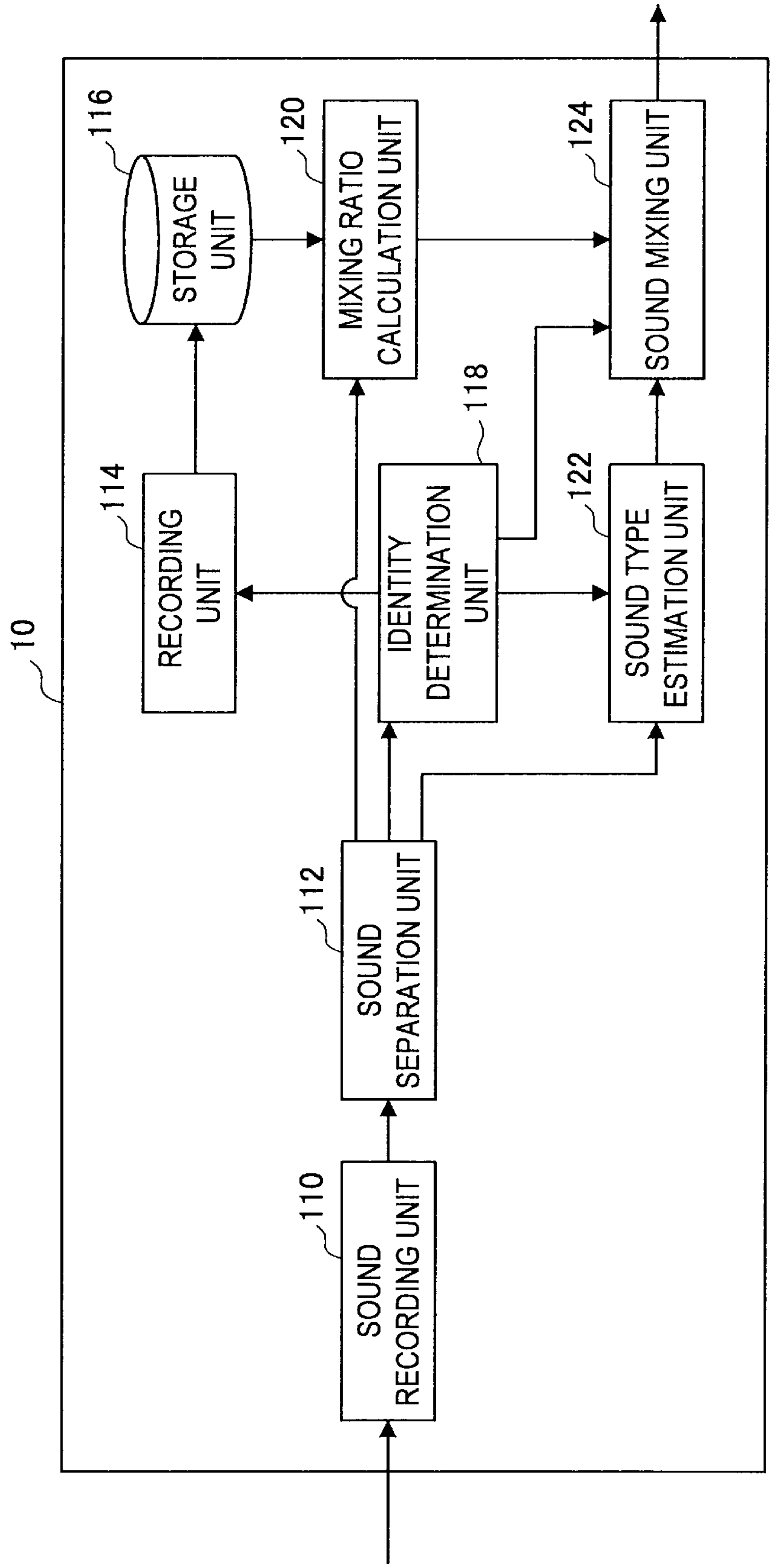
FIG. 1 is a block diagram showing a functional configuration of a sound processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A "DETAILED DESCRIPTION OF EMBODIMENT" will be described in the order shown below:

[1] Purpose of the embodiment

[2] Functional configuration of the sound processing apparatus

[3] Operation of the sound processing apparatus

[1] Purpose of the Embodiment

First, the purpose of the embodiment of the present invention will be described. A call voice, sound of a shooting target and the like are generally recorded by a device equipped with a sound recording apparatus capable of recording sound such as a mobile phone and camcorder. Sound recorded in a sound recording apparatus has sounds originating from various sound sources including a voice uttered by a person and ambient noise mixed therein. If sounds originating from various sound sources are mixed and a sound originating from a desired sound source is recorded relatively lower than sounds originating from other sound sources, there is an issue that it is difficult to determine content of the desired sound.

Thus, technologies to separate a mixed sound in which sounds originating from various sound sources are mixed and then each separated sound is remixed with a desired sound volume are disclosed. For example, a technology to learn characteristic data representing a likeness of voice or that of music in advance and estimate a mixing ratio of a voice signal to a music signal for the music signal on which a narration signal is superimposed to emphasize the desired voice is known. Also, a technology to separate a broadcast voice to which additional information is added in advance to separate the broadcast voice into a voice signal and background noise into a voice signal and background noise after the broadcast voice is received so that the voice signal can be remixed with a desired sound volume is known.

However, in related art, there is an issue that it is difficult to separate a mixed sound or remix sounds in a desired ratio without learning in advance or addition of information in advance. That is, since it is difficult to learn in advance or add information in advance for content personally shot or the like, instead of sound or broadcast sound input in real time, it is difficult to acquire a desired sound. Thus, with the above situation being focused on, a sound processing apparatus 10 according to an embodiment of the present invention has been developed. According to the sound processing apparatus 10 in the present embodiment, a mixed sound originating from various sound sources can be separated and then remixed in a desired ratio without performing preprocessing.

[2] Functional Configuration of the Sound Processing Apparatus

Next, the functional configuration of the sound processing apparatus 10 will be described with reference to FIG. 1. As described above, the sound processing apparatus 10 according to the present embodiment can separate a mixed sound originating from various sound sources and then remix in a desired ratio without performing preprocessing. As the sound processing apparatus 10, for example, a sound recording/reproducing apparatus mounted in an imaging apparatus can be exemplified.

To record a sound signal by a sound processing apparatus mounted in an imaging apparatus, a sound originating from a desired sound source may not be recorded in an appropriate volume balance intended by an operator of the imaging apparatus because the sound originating from the desired sound source is masked by sounds originating from other sound sources. Moreover, if sounds recorded in a plurality of situations are reproduced, the recording level may fluctuate greatly so that it is frequently difficult to listen to sound comfortably at a fixed reproduction volume. However, according to the sound processing apparatus 10 in the present embodiment, it becomes possible to record a sound originating from a desired sound source in an appropriate volume balance intended by an operator or to listen to sound comfortably by recording the sound at a fixed reproduction volume.

FIG. 1 is a block diagram showing the functional configuration of the sound processing apparatus 10 according to the present embodiment. As shown in FIG. 1, the sound processing apparatus 10 includes a sound recording unit 110, a sound separation unit 112, a recording unit 114, a storage unit 116, an identity determination unit 118, a sound type estimation unit 122, a mixing ratio calculation unit 120, and a sound mixing unit 124.

The sound recording unit 110 records a sound and discretely quantizes the recorded sound. The sound recording unit 110 includes two or more physically separated recording units (for example, microphones). The sound recording unit 110 may include two recording units, one recording unit to record a left sound and the other recording unit to record a right sound. The sound recording unit 110 provides the discretely quantized sound to the sound separation unit 112 as an input sound. The sound recording unit 110 may provide the input sound to the sound separation unit 112 in units of blocks of a predetermined length.

The sound separation unit 112 has a function to separate the input sound into a plurality of sounds originating from a plurality of sound sources. More specifically, the input sound provided by the sound recording unit 110 is separated using statistical independence of sound sources and differences in spatial transfer characteristics. As described above, when the input sound is provided from the sound recording unit 110 in units of blocks of a predetermined length, the sound may be separated in units of the blocks.

As a concrete technique to separate sound sources by the sound separation unit 112, for example, a technique using the independent component analysis (article 1: Y. Mori, H. Saruwatari, T. Takatani, S. Ukai, K. Shikano, T. Hietaka, T. Morita, Real-Time Implementation of Two-Stage Blind Source Separation Combining SIMO-ICA and Binary Masking, Proceedings of IWAENC2005, (2005).) may be used. A technique that uses a paucity of overlapping between time-frequency components of sound (article 2: O. Yilmaz and S. Richard, Blind Separation of Speech Mixtures via Time-Frequency Masking, IEEE TRANSACTIONS ON SIGNAL PROCESSING, VOL. 52, NO. 7, JULY (2004).) may also be used.

The identity determination unit 118 has a function, when an input sound is separated into a plurality of sounds in units of blocks by the sound separation unit 112, to determine whether the separated sounds are identical among a plurality of blocks. The identity determination unit 118 determines whether separated sounds between consecutive blocks originate from the same sound source using, for example, the distribution of amplitude information, volume, direction information and the like at discrete times of separated sounds provided by the sound separation unit 112.

The recording unit 114 has a function to record volume information of sounds separated by the sound separation unit in the storage unit 116 in units of blocks. Volume information recorded in the storage unit 116 includes, for example, sound type information of each separated sound acquired by the identity determination unit 118 and the average value, maximum value, variance and the like of separated sounds acquired by the sound separation unit 112. In addition to real-time sound, the average value of volume of separated sounds on which sound processing was performed in the past may be recorded. If volume information of input sound is available prior to the input sound, the volume information may be recorded.

The sound type estimation unit 122 has a function to estimate the sound type of a plurality of sounds separated by the sound separation unit 112. The sound type (steady or non-steady, noise or sound) is estimated, for example, from sound information obtained from the volume of separated sound and the distribution, maximum value, average value, variance, zero crossing number and the like of amplitude information, and direction distance information. Here, detailed functions of the sound type estimation unit 122 will be described. A case in which the sound processing apparatus 10 is mounted in an imaging apparatus will be described below. The sound type estimation unit 122 determines whether any sound originating from the neighborhood of the imaging apparatus such as a voice of an operator of the imaging apparatus or noise resulting from an operation of the operator is contained. Accordingly, by which sound source a sound is caused can be estimated.

Figure 2:
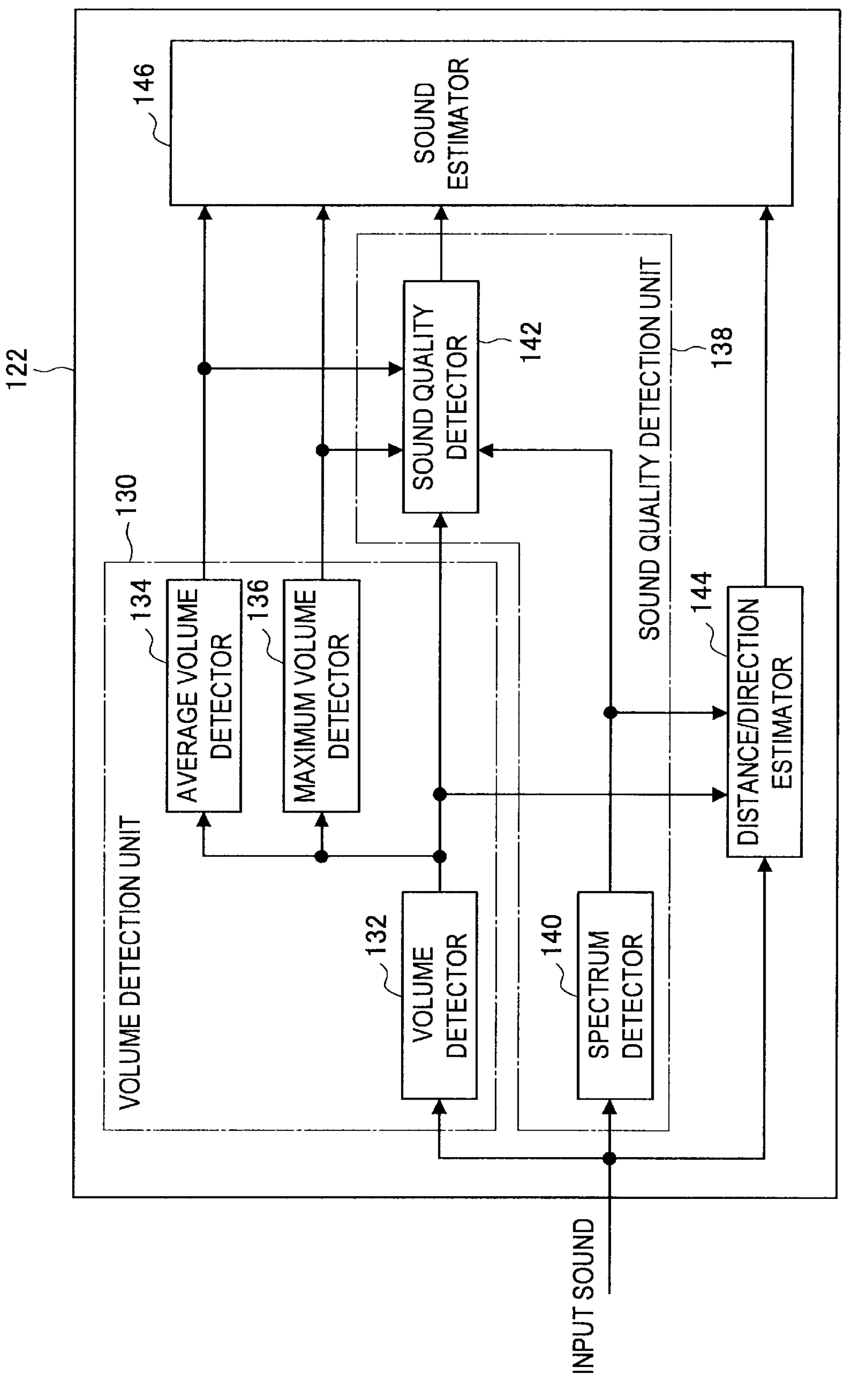
FIG. 2 is a functional block diagram showing the configuration of a sound type estimation unit according to the embodiment.

FIG. 2 is a functional block diagram showing the configuration of the sound type estimation unit 122. The sound type estimation unit 122 includes a volume detection unit 130 including a volume detector 132, an average volume detector 134, and a maximum volume detector 136, a sound quality detection unit 138 including a spectrum detector 140 and a sound quality detector 142, a distance/direction estimator 144, and a sound estimator 146.

The volume detector 132 detects a volume value sequence (amplitude) of input sound given in frames of a predetermined length (for example, several tens msec) and outputs the detected volume value sequence of input sound to the average volume detector 134, the maximum volume detector 136, the sound quality detector 142, and the distance/direction estimator 144.

The average volume detector 134 detects the average value of volume of input sound, for example, in frames based on the volume value sequence in frames input from the volume detector 132. The average volume detector 134 outputs the detected average value of volume to the sound quality detector 142 and the sound estimator 146.

The maximum volume detector 136 detects the maximum value of volume of input sound, for example, in frames based on the volume value sequence in frames input from the volume detector 132. The maximum volume detector 136 outputs the detected maximum value of volume of input sound to the sound quality detector 142 and the sound estimator 146.

The spectrum detector 140 detects each spectrum in the frequency domain of input sound by performing, for example, FFT (Fast Fourier Transform) on the input sound. The spectrum detector 140 outputs detected spectra to the sound quality detector 142 and the distance/direction estimator 144.

The sound quality detector 142 has an input sound, average value of volume, maximum value of volume, and spectrum input thereinto, detects a likeness of human voice, that of music, steadiness, and impulse property of the input sound, and outputs detection results to the sound estimator 146. The likeness of human voice may be information indicating whether a portion or all of the input sound matches human voice or to which extent the input sound resembles human voice. Also, the likeness of music may be information indicating whether a portion or all of the input sound matches music or to which extent the input sound resembles music.

Steadiness indicates, for example, like an air-conditioning sound, a property whose statistical property of sound does not change significantly over time. The impulse property indicates, for example, like a blow sound or explosive, a property full of noise in which energy is concentrated in a short period of time.

The sound quality detector 142 can detect, for example, a likeness of human voice based on the degree of matching of the spectral distribution of input sound and that of human voice. The sound quality detector 142 may also detect a higher impulse property with an increasing maximum value of volume by comparing maximum values of volume of each frame or other frames.

The sound quality detector 142 may analyze sound quality of input sound using signal processing technology such as the zero crossing method and LPC (Linear Predictive Coding) analysis. According to the zero crossing method, a fundamental period of input sound is detected and therefore, the sound quality detector 142 may detect a likeness of human voice based on whether the fundamental period is contained in the fundamental period (for example, 100 to 200 Hz) of human voice.

The distance/direction estimator 144 has an input sound, volume value sequence of the input sound, spectrum of the input sound and the like input thereinto. The distance/direction estimator 144 has a function, based on the input, as a positional information calculation unit that estimates the sound source of the input sound or positional information such as direction information and distance information of the sound source from which a dominant sound contained in the input sound originates. The distance/direction estimator 144 can collectively estimate the position of the sound source even if a reverberation or the reflection of sound caused by the main body of imaging apparatus has a great influence by combining the phase, volume, and volume value sequence of input sound and estimation methods of positional information of the sound source based on the average volume value and maximum volume value in the past. An example of the estimation method of the direction information and distance information by the distance/direction estimator 144 will be described with reference to FIGS. 3 to 6.

Figure 3:
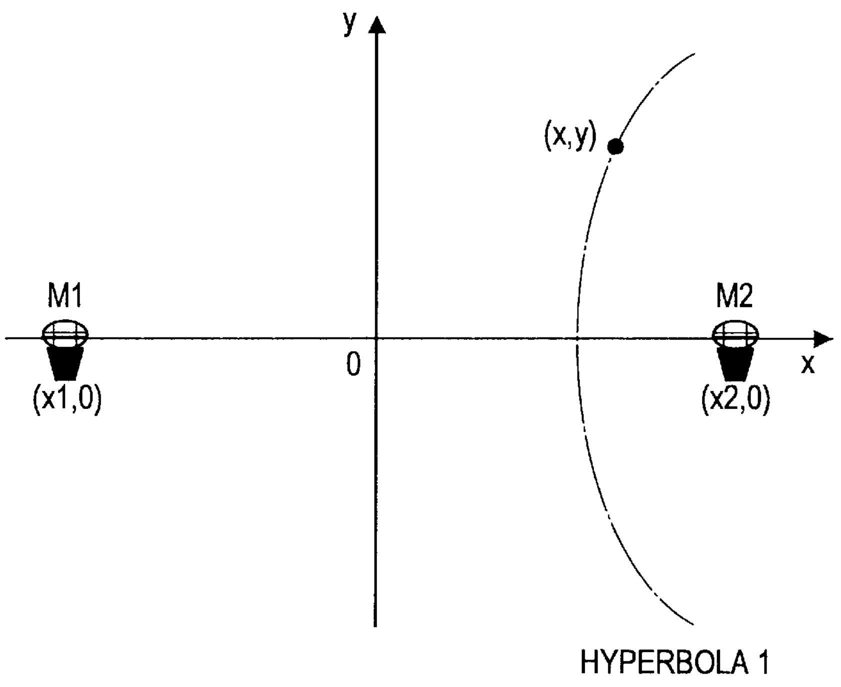
FIG. 3 is an explanatory view showing a state that a sound source position of input sound is estimated based on a phase difference of two input sounds.

FIG. 3 is an explanatory view showing a state that the sound source position of an input sound is estimated based on a phase difference of two input sounds. If the sound source is assumed to be a point sound source, the phase of each input sound reaching a microphone M1 and a microphone M2 constituting the sound recording unit 110 and a phase difference of the input sounds can be measured. Further, a difference between the distance from the microphone M1 to the sound source position of input sound and that from the microphone M2 can be calculated from the phase difference and values of a frequency f and a sound velocity c of the input sound. The sound source is present on a set of points where the difference of distance is constant. It is known that such a set of points where the difference of distance is constant forms a hyperbola.

It is assumed, for example, that the microphone M1 is positioned at (x1, 0) and the microphone M2 at (x2, 0) (generality is not lost under this assumption). If a point on a set of the sound source position to be determined is at (x, y) and the difference of distance is d, Formula 1 shown below holds:

[Equation 1]

$$\sqrt{(x-x_1)^2+y^2}-\sqrt{(x-x_2)^2+y^2}=d \quad \text{(Formula 1)}$$

Further, Formula 1 can be expanded into Formula 2, from which Formula 3 representing a hyperbola is derived:

[Equation 2]

$$\{(x-x_1)^2+2y^2+(x-x_2)^2-d^2\}^2 = 4\{(x-x_1)^2+y^2\}\{(x-x_2)^2+y^2\} \quad \text{(Formula 2)}$$

[Equation 3]

$$\frac{\left(x-\frac{x_1+x_2}{2}\right)^2}{\left(\frac{d}{2}\right)^2}-\frac{y^2}{\left(\frac{1}{2}\right)^2}=1 \quad \text{(Formula 3)}$$

The distance/direction estimator 144 can also determine to which of the microphone M1 and the microphone M2 the distance/direction estimator 144 is closer based on a volume difference between input sounds recorded by the microphone M1 and the microphone M2. Accordingly, for example, as shown in FIG. 3, the sound source can be determined to be present on a hyperbola 1 closer to the microphone M2.

Incidentally, it is necessary for the frequency f of input sound used for calculation of a phase difference to satisfy a condition on a distance between the microphone M1 and the microphone M2 in Formula 4:

[Equation 4]

$$f<\frac{c}{2d} \quad \text{(Formula 4)}$$

Figure 4:
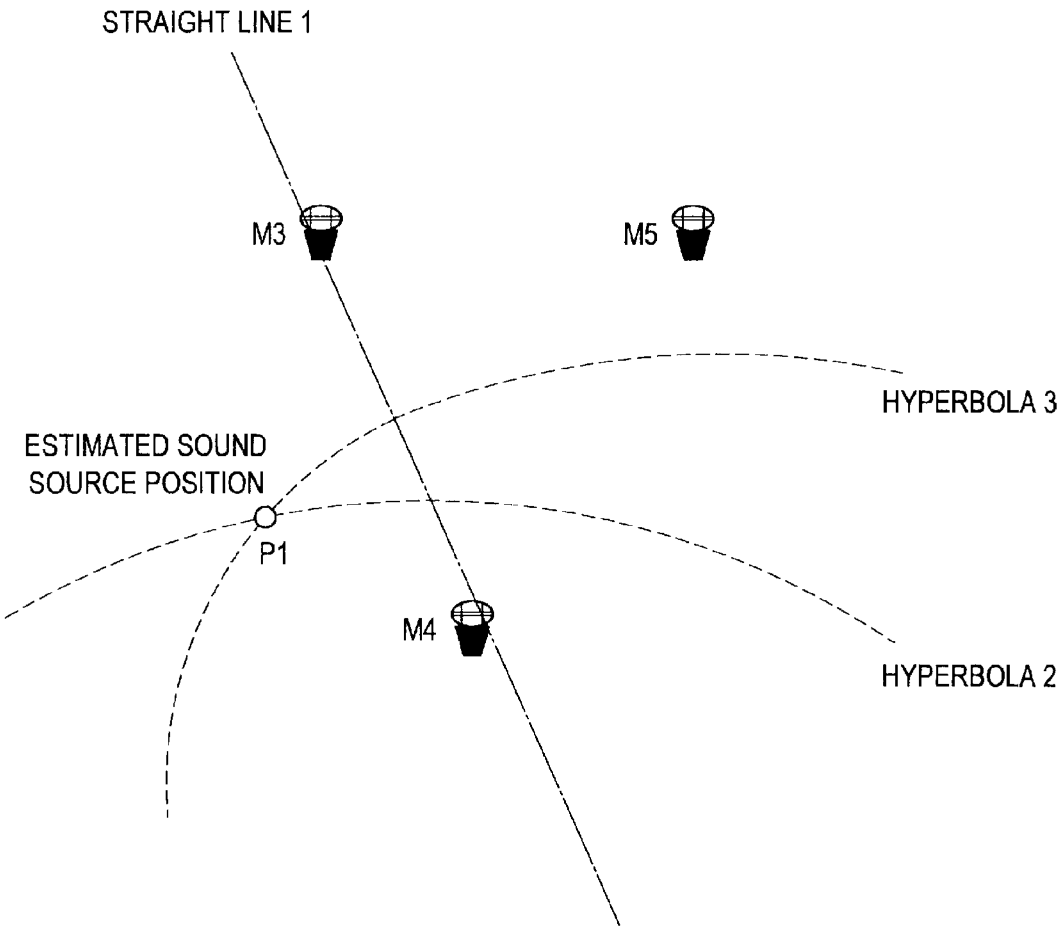
FIG. 4 is an explanatory view showing a state that a sound source position of input sound is estimated based on a phase difference of three input sounds.

FIG. 4 is an explanatory view showing a state that the sound source position of an input sound is estimated based on phase differences among three input sounds. Arrangement of a microphone M3, a microphone M4, and a microphone M5 constituting the sound recording unit 110 as shown in FIG. 4 is assumed. The phase of input sound arriving at the microphone M5 may be delayed when compared with that of input sound arriving at the microphone M3 or the microphone M4. In such a case, the distance/direction estimator 144 can determine that the sound source is positioned on the opposite side of the microphone M5 with respect to a straight line 1 linking the microphone M3 and the microphone M4 (front/back determination).

Further, the distance/direction estimator 144 calculates a hyperbola 2 on which the sound source could be present based on a phase difference of input sounds arriving at each of the microphone M3 and the microphone M4. Then, the distance/direction estimator 144 can calculate a hyperbola 3 on which the sound source could be present based on a phase difference of input sounds arriving at each of the microphone M4 and the microphone M5. As a result, the distance/direction estimator 144 can estimate that an intersection P1 of the hyperbola 2 and the hyperbola 3 is the sound source position.

Figure 5:
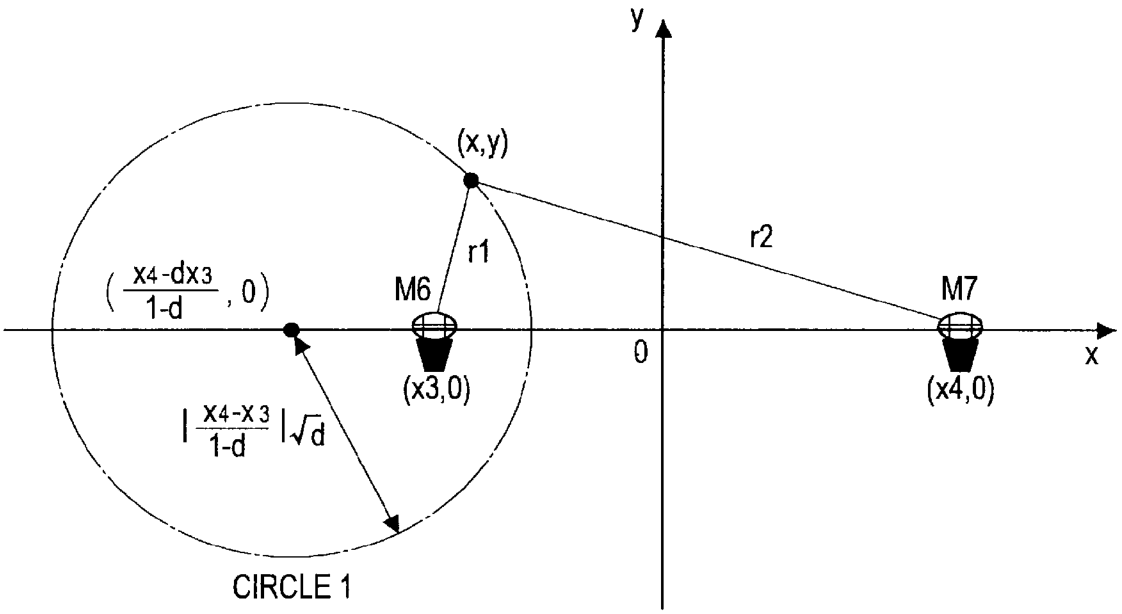
FIG. 5 is an explanatory view showing a state that a sound source position of input sound is estimated based on a volume of two input sounds.

FIG. 5 is an explanatory view showing a state that the sound source position of an input sound is estimated based on volumes of two input sounds. If the sound source is assumed to be a point sound source, the volume measured at a point is inversely proportional to the square of distance based on the inverse square law. If a microphone M6 and a microphone M7 constituting the sound recording unit 110 as shown in FIG. 5 is assumed, a set of points where the ratio of volumes arriving at the microphone M6 and the microphone M7 is constant forms a circle. The distance/direction estimator 144 can determine the radius and the center position of the circle on which the sound source is present by determining the ratio of volume from values of volume input from the volume detector 132.

It is assumed, as shown in FIG. 5, that the microphone M6 is positioned at (x3, 0) and the microphone M7 at (x4, 0). In this case (generality is not lost under this assumption), if a point on a set of the sound source position to be determined is at (x, y), distances r1 and r2 from each microphone to the sound source can be expressed as Formula 5 below:

[Equation 5]

$$r_1=\sqrt{(x-x_3)^2+y^2}\,r_2=\sqrt{(x-x_4)^2+y^2} \quad \text{(Formula 5)}$$

Here, Formula 6 below holds thanks to the inverse square law:

[Equation 6]

$$\frac{1}{r_1^2}:\frac{1}{r_2^2}=\text{constant} \quad \text{(Formula 6)}$$

Formula 6 is transformed to Formula 7 using a positive constant d (for example, 4):

[Equation 7]

$$\frac{r_2^2}{r_1^2} = d \quad \text{(Formula 7)}$$

Formula 8 below is derived by substitution into r1 and r2 in Formula 7:

[Equation 8]

$$\frac{(x-x_4)^2+y^2}{(x-x_3)^2+y^2} = d \quad \text{(Formula 8)}$$

$$\left(x - \frac{x_4 - dx_3}{1-d}\right)^2 + y^2 = \frac{d(x_4-x_3)^2}{(1-d)^2}$$

From Formula 8, the distance/direction estimator 144 can estimate that, as shown in FIG. 5, the sound source is present on a circle 1 whose center coordinates are represented by Formula 9 and whose radius is represented by Formula 10.

[Equation 9]

$$\left(\frac{x_4 - dx_3}{1-d}, 0\right) \quad \text{(Formula 9)}$$

[Equation 10]

$$\left|\frac{x_4 - x_3}{1-d}\right|\sqrt{d} \quad \text{(Formula 10)}$$

Figure 6:
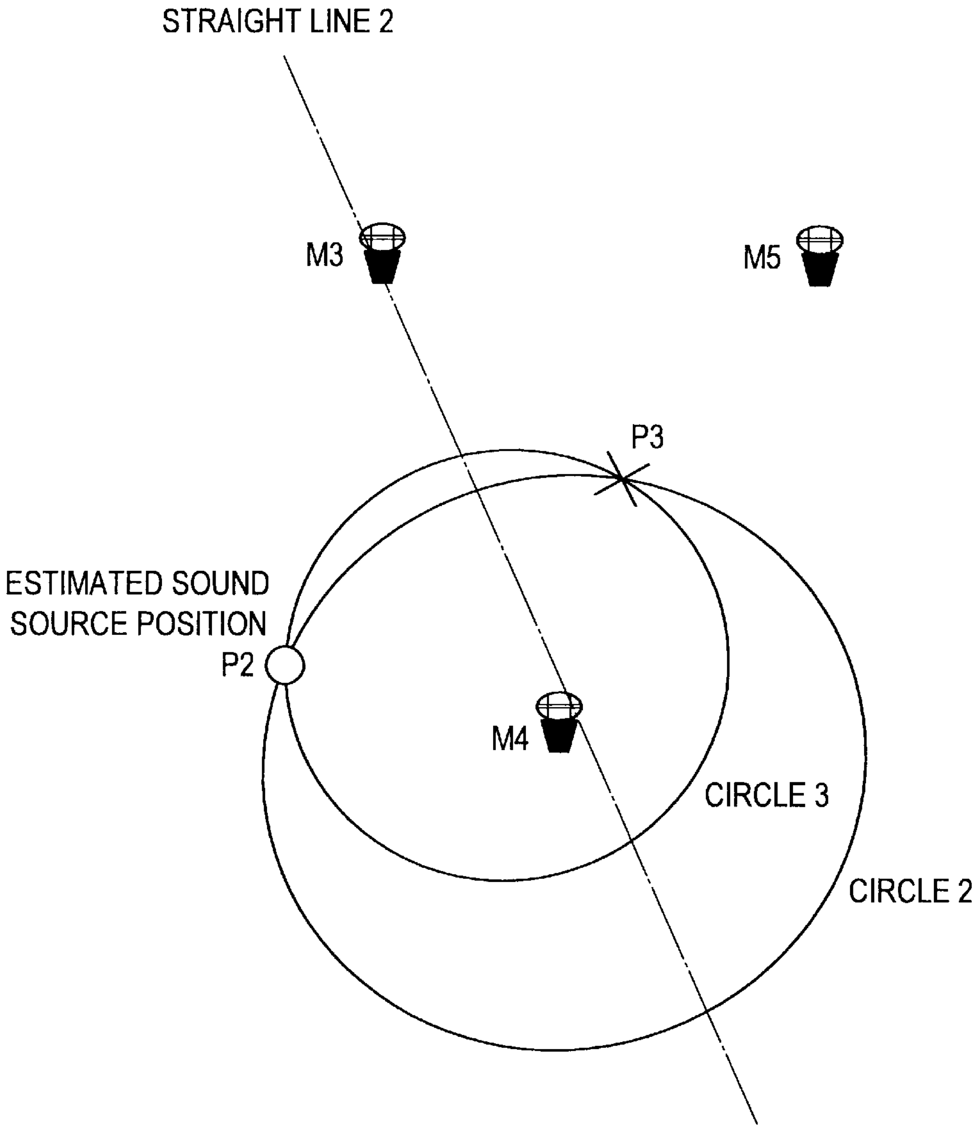
FIG. 6 is an explanatory view showing a state that a sound source position of input sound is estimated based on a volume of three input sounds.

FIG. 6 is an explanatory view showing a state that the sound source position of an input sound is estimated based on volumes of three input sounds. Arrangement of the microphone M3, the microphone M4, and the microphone M5 constituting the sound recording unit 110 as shown in FIG. 6 is assumed. The phase of input sound arriving at the microphone M5 may be delayed when compared with that of input sound arriving at the microphone M3 or the microphone M4. In such a case, the distance/direction estimator 144 can determine that the sound source is positioned on the opposite side of the microphone M5 with respect to a straight line 2 linking the microphone M3 and the microphone M4 (front/back determination).

Further, the distance/direction estimator 144 calculates a circle 2 on which the sound source could be present based on a volume ratio of input sounds arriving at each of the microphone M3 and the microphone M4. Then, the distance/direction estimator 144 can calculate a circle 3 on which the sound source could be present based on a volume ratio of input sounds arriving at each of the microphone M4 and the microphone M5. As a result, the distance/direction estimator 144 can estimate that an intersection P2 of the circle 2 and the circle 3 is the sound source position. If four or more microphones are used, the distance/direction estimator 144 can estimate more precisely including spatial arrangement of the sound source.

The distance/direction estimator 144 estimates, as described above, the position of the sound source of input sound based on a phase difference or volume ratio of input sounds and outputs direction information or distance information of the estimated sound source to the sound estimator 146. Table 1 below lists the input/output of each component of the volume detection unit 130, the sound quality detection unit 138, and the distance/direction estimator 144 described above.

TABLE 1

| Block | Input | Output |
|---|---|---|
| Volume detector | Input sound | Volume value sequence (amplitude) in frame |
| Average volume detector | Volume value sequence (amplitude) in frame | Average value of volume |
| Maximum volume detector | Volume value sequence (amplitude) in frame | Maximum value of volume |
| Spectrum detector | Input sound | Spectrum |
| Sound quality detector | Input sound<br>Average value of volume<br>Maximum value of volume<br>Spectrum | Likeness of human voice<br>Likeness of music<br>Steady or non-steady<br>Impulse property |
| Distance/direction estimator | Input sound<br>Volume value sequence (amplitude) in frame<br>Spectrum | Direction information<br>Distance information |

If sounds originating from a plurality of sound sources are superimposed on an input sound, it is difficult for the distance/direction estimator 144 to precisely estimate the sound source position of a sound predominantly contained in the input sound. However, the distance/direction estimator 144 can estimate a position close to the sound source position of the sound predominantly contained in the input sound. The estimated sound source position may be used as an initial value for sound separation by the sound separation unit 112 and thus, the sound processing apparatus 10 can perform a desired operation even if there is an error in the sound source position estimated by the distance/direction estimator 144.

The description of the configuration of the sound type estimation unit 122 will be resumed with reference to FIG. 2. The sound estimator 146 collectively determines whether any neighborhood sound originating from a specific sound source in the neighborhood of the sound processing apparatus 10 such as a voice of the operator or noise resulting from an operation of the operator is contained in the input sound based on at least one of the volume, sound quality, and positional information of input sound. If the sound estimator 146 determines that a neighborhood sound is contained in the input sound, the sound estimator 146 has a function as a sound determination unit that outputs a message that a neighborhood sound is contained in the input sound (operator voice present information) and positional information estimated by the distance/direction estimator 144 to the sound separation unit 112.

More specifically, if the distance/direction estimator 144 estimates that the position of the sound source of input sound is behind an imaging unit (not shown) imaging video in the imaging direction and the input sound has sound quality that matches or resembles that of human voice, the sound estimator 146 may determine that a neighborhood sound is contained in the input sound.

If the position of the sound source of input sound is behind an imaging unit in the imaging direction and the input sound has sound quality that matches or resembles that of human voice, the sound estimator 146 may determine that the voice of the operator is predominantly contained as a neighborhood sound in the input sound. As a result, a mixed sound in which the sound ratio of the voice of the operator is reduced can be obtained from the sound mixing unit 124 described later.

The sound estimator 146 has the position of the sound source of input sound within the range of a setting distance (neighborhood of the sound processing apparatus 10, for example, within 1 m of the sound processing apparatus 10) from the recording position. If the input sound contains an impulse sound and the input sound is higher than an average volume in the past, the sound estimator 146 may determine that the input sound contains a neighborhood sound caused by a specific sound source. Here, an impulse sound such as "click" and "bang" is frequently caused when the operator of an imaging apparatus operates a button of the imaging apparatus or shifts the imaging apparatus from one hand to the other. Moreover, the impulse sound is caused by an imaging apparatus equipped with the sound processing apparatus 10 and thus, it is highly likely that the impulse sound is recorded at a relatively large volume.

Therefore, the sound estimator 146 has the position of the sound source of input sound within the range of a setting distance from the recording position. If input sound contains an impulse sound and the input sound is higher than an average volume in the past, the input sound can be determined to predominantly contain noise resulting from an operation of the operator as a neighborhood sound. As a result, a mixed sound in which the sound ratio of noise resulting from an operation of the operator is reduced can be obtained from the sound mixing unit 124 described later.

In addition, Table 2 summarizes examples of information input into the sound estimator 146 and determination results of the sound estimator 146 based on the input information. By combining with a proximity sensor, temperature sensor or the like, precision of determination by the sound estimator 146 can be improved.

TABLE 2

| Sound estimator input | | | | | | | | | | |
|---|---|---|---|---|---|---|---|---|---|---|
| Volume | | | Sound quality | | | | Direction and distance | | | |
| Volume | Average volume | Maximum volume | Likeness of human voice | Likeness of music | Steady or non-steady | Impulse property | Direction | Distance | Determination results | |
| High | Higher than average volume in the past | High | High | Low | Non-steady | Normal | Behind main body | Close | Non-steady sound | Operator voice |
| Medium | Comparatively higher than average volume in the past | Medium to high | Normal | Normal | Non-steady | Normal | In front of main body | Close to far | | Object sound |
| High | Higher than average volume in the past | High | Low | Low | Non-steady | High | All directions | Close | Non-steady noise | Operation noise |
| Low | Comparatively lower than average volume in the past | Medium | Low | Low | Non-steady | High | All directions | Far | | Impulsive environmental sound |
| Low | Lower than average volume in the past | Low | Normal | Normal | Steady | Low | Direction unknown | Far | Steady noise | Environmental sound |

Returning to FIG. 1, the mixing ratio calculation unit 120 has a function to calculate the mixing ration of each sound in accordance with the sound type estimated by the sound type estimation unit 122. For example, a mixing ratio that lowers the volume of a dominant sound is calculated using separated sounds separated by the sound separation unit 112, sound type information by the sound type estimation unit 122, and volume information recorded in the recording unit 114.

When the sound type is more steady, a mixing ratio so that volume information does not change significantly between consecutive blocks is also calculated with reference to output information of the sound type estimation unit 122. When the sound type is not steady (non-steady) and noise is more likely, the mixing ratio calculation unit 120 lowers the volume of the sound concerned. On the other hand, if the sound type is non-steady a voice uttered by a person is more likely, the volume of the sound concerned is not much lowered when compared with noise sound.

Here, a method of fine-tuning the reduction rate will be described with reference to FIG. 7. Frequency characteristics (loudness characteristics) of human audition or a masking effect can be used as a method of fine-tuning the reduction rate. More specifically, a method below can be considered. In human audition characteristics, frequency components of 2 to 4 kHz are sensitive. If separated sounds whose volume is dominant mainly contain this band, the mixing ratio is set with an inclination so that the band concerned is relatively more suppressed when compared with other bands.

Figure 7:
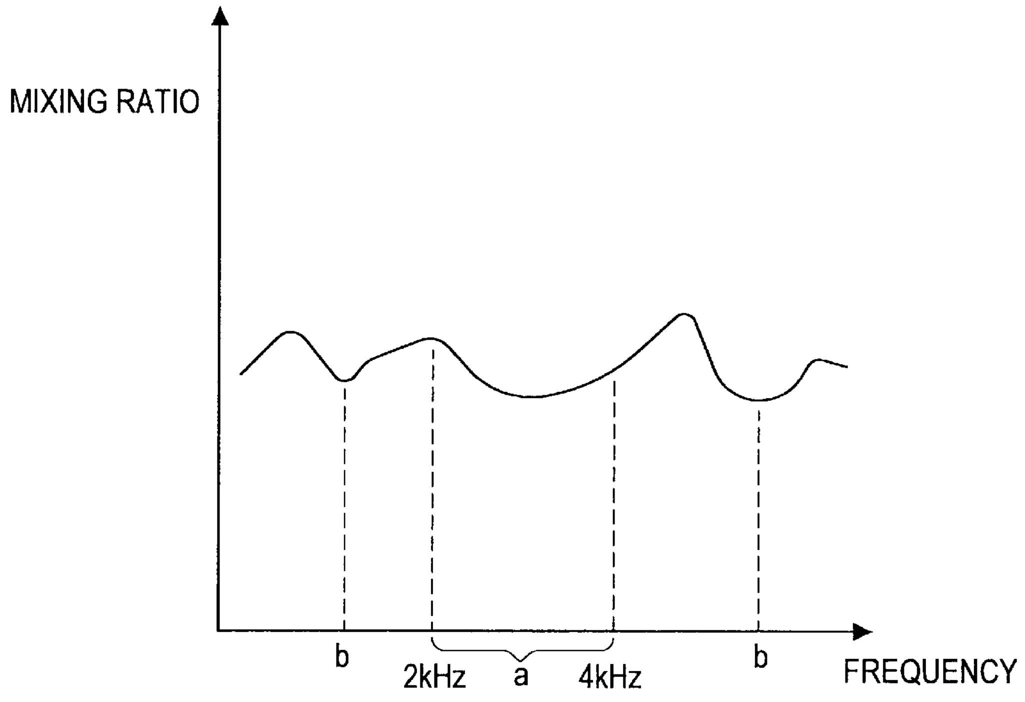
FIG. 7 is an explanatory view illustrating a method of fine-tuning a reduction rate according to the embodiment.

As shown in FIG. 7, a relatively smaller mixing ratio is set for 2 to 4 kHz (band a), which is a band more easily perceived by humans. Accordingly, other separated sounds can avoid being masked by separated sounds of dominant volume. The mixing ratio is relatively reduced for frequency bands (band b) with less separation precision.

Also, a spectrum masking effect (phenomenon in which if there is a loud sound at some frequency at a certain time, sounds in neighboring frequencies are inaudible by being masked) is considered. In this case, the mixing ratio of sound of frequency bands (band b) in which precision of separation by the sound separation unit 112 is not adequately secured is relatively reduced. Accordingly, a mixing ratio with an inclination so as to be masked by sound of neighboring frequencies (whose separation precision is adequately secured) can be set.

By using the above technique, a remixing ratio of separated sounds that allows to hear a sound being masked by a dominant sound source due to low amplitude is automatically calculated. At this point, the total volume may be made constant if possible within a range smoothly linkable in the time direction with no significant change in volume of each sound source between the previous block and the current block determined from volume information of separated sounds and the remixing ratio. Alternatively, a mixing ratio to significantly reduce a specific sound source may be calculated in accordance with settings specified by the user.

Returning to FIG. 1, the sound mixing unit 124 has a function to mix a plurality of sounds separated by the sound separation unit 112 in the mixing ratio provided by the mixing ratio calculation unit 120. For example, the sound mixing unit 124 may mix a neighborhood sound of the sound processing apparatus 10 and a sound to be recorded so that the volume ratio occupied by the neighborhood sound is made lower than that of the neighborhood sound occupied in the input sound. Accordingly, if the volume of neighborhood sound of the input sound is unnecessarily high, a mixed sound in which the volume ratio occupied by the sound to be recorded is increased from that of the sound to be recorded occupied in the input sound can be obtained. As a result, the sound to be recorded can be prevented from being buried by the neighborhood sound.

[3] Operation of the Sound Processing Apparatus

Figure 8:
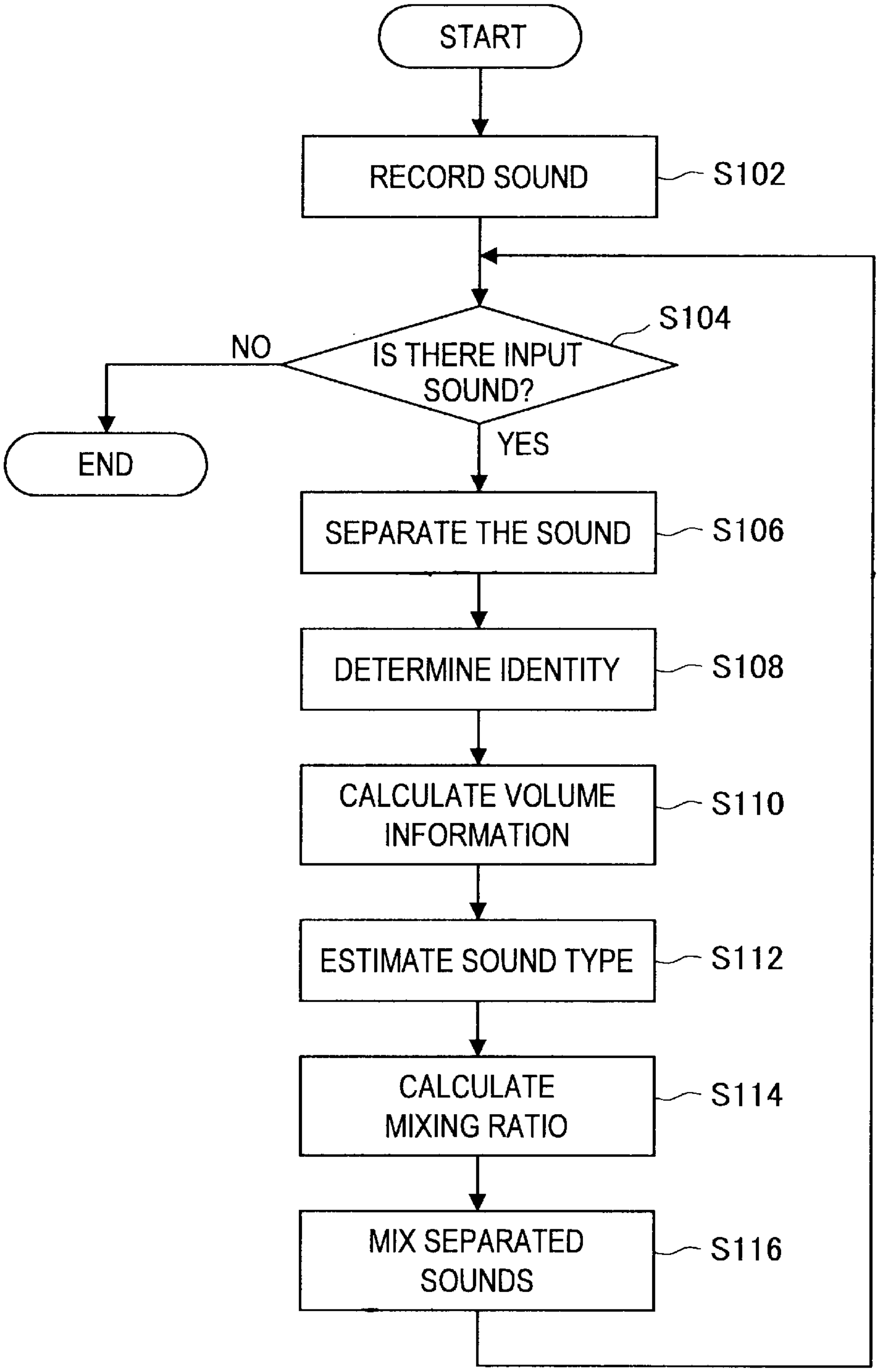
FIG. 8 is flow chart showing the flow of processing of a sound processing method executed by the sound processing apparatus according to the embodiment.

In the foregoing, the functional configuration of the sound processing apparatus 10 according to the present embodiment has been described. Next, the sound processing method executed by the sound processing apparatus 10 will be described with reference to FIG. 8. FIG. 8 is a flow chart showing the flow of processing of the sound processing method executed by the sound processing apparatus 10 according to the present embodiment. As shown in FIG. 8, first the sound recording unit 110 of the sound processing apparatus 10 records sound (S102).

Next, the sound recording unit 110 determines whether sound has been input (S104). If there has been no input sound at step S104, the sound recording unit 110 terminates processing. If there has been input sound at step S104, the sound separation unit 112 separates the input sound into a plurality of sounds (S106). At step S106, the sound separation unit 112 may separate the input sound in units of blocks of a predetermined length.

Then, the identity determination unit 118 determines whether the input sound separated in units of blocks of a predetermined length at step S106 is identical among a plurality of blocks (S108). The identity determination unit 118 may determine the identity by using the distribution of amplitude information, volume, direction information and the like at discrete times of sounds in units of blocks separated at step S104.

Next, the sound type estimation unit 122 calculates volume information of each block (S110) to estimate the sound type of each block (S112). At step S112, the sound type estimation unit 122 separates the sound into a voice uttered by the operator, sound caused by an object, noise resulting from an operation of the operator, impulse sound, steady environmental sound and the like.

Next, the mixing ratio calculation unit 120 calculates a mixing ratio of each sound in accordance with the sound type estimated at step S112 (S114). The mixing ratio calculation unit 120 calculates a mixing ratio that reduces the volume of a dominant sound based on volume information calculated at step S110 and sound type information calculated at step S112.

Then, the plurality of sounds separated at step S106 is mixed using the mixing ratio of each sound calculated at step S114 (S116). In the foregoing, the sound separation method executed by the sound processing apparatus 10 has been described.

According to the above embodiment, as described above, an input sound input into the sound processing apparatus 10 is separated into sounds caused by a plurality of sound sources and a plurality of separated sound types is estimated. Then, a mixing ratio of each sound is calculated in accordance with the estimated sound type and each separated sound is remixed in the mixing ratio. Accordingly, volumes originating from different sound sources can independently be controlled. Moreover, a desired sound can be prevented from being made inaudible by being masked by a sound whose volume is higher than that of the desired sound. Also, the volume originating from each sound source can be adjusted to a desired volume without the need to arrange a microphone or the like for each different sound source. Further, even if the volume of a desired sound is different from block to block of a predetermined length, the volume can automatically be adjusted without any volume operation by the user.

It should be understood by those skilled in the art that various modifications, combinations, sub-combinations and alterations may occur depending on design requirements and other factors insofar as they are within the scope of the appended claims or the equivalents thereof.

In the above embodiment, for example, the present invention is described by applying to an imaging apparatus equipped with the sound processing apparatus 10, but the present invention is not limited to such an example. For example, the present invention may be applied to a sound recording apparatus having no imaging function in general or a communication apparatus.

The present application contains subject matter related to that disclosed in Japanese Priority Patent Application JP 2008-283067 filed in the Japan Patent Office on Nov. 4, 2008, the entire content of which is hereby incorporated by reference.

What is claimed is:

1. A sound processing apparatus, comprising:

a sound separation unit that separates an input sound into a plurality of sounds caused by a plurality of sound sources, wherein the sound separation unit separates the input sound into a plurality of sounds in units of blocks of a predetermined length and determines whether the sounds separated by the sound separation unit are identical among the plurality of blocks, the determination being based on whether the blocks originate from the same sound source;

a sound type estimation unit that estimates sound types of the plurality of sounds separated by the sound separation unit;

a mixing ratio calculation unit that automatically calculates a mixing ratio of each sound in accordance with the sound type estimated by the sound type estimation unit; and a sound mixing unit that mixes the plurality of sounds separated by the sound separation unit in the mixing ratio calculated by the mixing ratio calculation unit.

2. The sound processing apparatus according to claim 1, further comprising:

a recording unit that records volume information of the sounds separated by the sound separation unit in units of the blocks.

3. The sound processing apparatus according to claim 1, wherein the sound separation unit separates the input sound into the plurality of sounds using statistical independence of sound and differences in spatial transfer characteristics.

4. The sound processing apparatus according to claim 1, wherein the sound separation unit separates the input sound into a sound originating from a specific sound source and other sounds using a paucity of overlapping between time-frequency components of sound sources.

5. The sound processing apparatus according to claim 1, wherein the sound type estimation unit estimates whether the input sound is a steady sound or non-steady sound using a distribution of amplitude information, direction, volume, and amplitude at discrete times of the input sound.

6. The sound processing apparatus according to claim 5, wherein the sound type estimation unit estimates whether the sound estimated to be a non-steady sound is a noise sound or a voice uttered by a person.

7. The sound processing apparatus according to claim 5, wherein the mixing ratio calculation unit calculates a mixing ratio that does not significantly change the volume of the sound estimated to be a steady sound by the sound type estimation unit.

8. The sound processing apparatus according to claim 7, wherein the mixing ratio calculation unit calculates a mixing ratio that lowers the volume of the sound estimated to be a noise sound by the sound type estimation unit and does not lower the volume of the sound estimated to be a voice uttered by a person.

9. A sound processing method, comprising the steps of:

separating with a sound separation unit an input sound input by a sound processing apparatus into a plurality of sounds, further comprising separating the input sound into units of blocks of a predetermined length and determining whether the separated sounds are identical among the plurality of blocks, the determination being based on whether the blocks originate from the same sound source;

estimating with a sound type estimation unit sound types of the plurality of separated sounds;

automatically calculating with a mixing ratio calculation unit a mixing ratio of each sound in accordance with the estimated sound type; and mixing the plurality of separated sounds in the calculated mixing ratio.

10. A non-transitory computer-readable medium comprising program code, the program code being operable, when executed by a computer system, to cause the computer system to function as a sound processing apparatus, comprising:

a sound separation unit that separates an input sound into a plurality of sounds, wherein the sound separation unit separates the input sound into a plurality of sounds in units of blocks of a predetermined length and determines whether the sounds separated by the sound separation unit are identical among the plurality of blocks, the determination being based on whether the blocks originate from the same sound source;

a sound type estimation unit that estimates sound types of the plurality of sounds separated by the sound separation unit;

a mixing ratio calculation unit that automatically calculates a mixing ratio of each sound in accordance with the sound type estimated by the sound type estimation unit; and a sound mixing unit that mixes the plurality of sounds separated by the sound separation unit in the mixing ratio calculated by the mixing ratio calculation unit.

* * * * *